Patented July 6, 1948

2,444,536

UNITED STATES PATENT OFFICE 2,444,536

SYNTHESIS OF N-ARYL-MALEIMIDES

Norman Edward Searle, Wilmington, Del., assignor to E. I. du Pont de Nemours & Company, Wilmington, Del., a corporation of Delaware No Drawing. Application May 14, 1946, Serial No. 669,589

8 Claims. (Cl. 260—313)

This invention relates to a process for the production of imides. More particularly, it relates to a new method for the preparation of maleimides.

This application is a continuation in part of copending application Serial No. 501,133 filed September 3, 1943.

The commonly known processes for the preparation of maleimides are based on the pyrolytic dehydration of maleamic acids. This requires an excessively high temperature for operation. The resulting maleimides, obtained in low yield if at all, are usually accompanied by a number of undesirable by-products. These processes have not been particularly successful because of the difficulty of dehydration of the maleamic acids and moreover, the corresponding maleimides, possessing a reactive conjugated double bond, are readily susceptible, at the elevated temperatures of pyrolysis to polymerization and addition reactions with such reagents as amines and mineral acids.

It is an object of this invention to prepare maleimides. A particular object is the preparation of N-arylmaleimides. Still another object is to provide a new process for the preparation of maleimides in satisfactory yields with a minimum of side reaction products. Other objects will appear hereinafter.

These objects are accomplished by the present invention wherein is reacted a maleamic acid having hydrogen on the amido nitrogen with an anhydride of a saturated fatty acid $(RCO)_2O$ where R is a one to four carbon alkyl in the presence of an anhydrous alkali metal salt of a saturated fatty acid, $RCOOH$ where R is a one to four carbon alkyl at a temperature in excess of 60° C. and below the decomposition point of the reactants and the resulting maleimide, and the maleimide so formed is isolated.

In a more detailed and preferred practice of the invention, an aryl maleamic acid is treated with acetic anhydride in the presence of fused sodium acetate at a temperature of 80–100° C., the amount of said sodium acetate comprising between 5 to 20% of the weight of the said anhydride and the amount of said anhydride being present in a molal amount of 1 to 4 times the molal quantity of the maleamic acid.

The reaction leading to maleimides by the process of this invention is illustrated by the following equation:

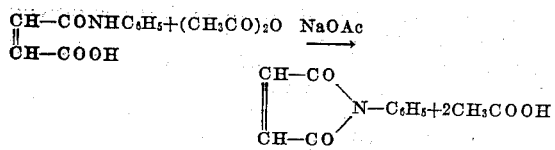

The following examples illustrate in more detail the practice of the invention. The parts are parts by weight unless otherwise indicated.

EXAMPLE I

A mixture of 57.4 parts of N-phenylmaleamic acid (M. P. 209–210° C.), 96.5 parts of 95% acetic anhydride, and 10 parts of fused sodium acetate was heated on the steam bath with stirring. As soon as the temperature reached 80° C., the reaction mixture become a clear, bright yellow solution. However, the appreciable heat of reaction carried the temperature from 80° C. to approximately 93° C. during a period of 5 to 15 minutes after which time the reaction was allowed to stand at room temperature for 1 hour. The cooled reaction mixture was then poured slowly into a vigorously stirred slurry of ice and water (800 parts). The resulting yellow crystalline precipitate was filtered, washed to neutrality with water, and dried in vacuo over phosphorus pentoxide. There was thus obtained 44 parts (85% of the theoretical yield) of yellow crystalline N-phenylmaleimide, M. P. 90–91° C.

Alternatively, the cooled (25° C.) reaction product may be treated further with absolute ethyl alcohol to assist the decomposition of the acetic anhydride before precipitating the product by pouring into water. When this method is used, it is advisable to maintain a temperature below 60° C. while in contact with the absolute ethyl alcohol. The yield of pure N-phenylmaleimide, M. P. 90–91° C., is substantially the same as that described in the preceding method of isolation.

The importance of using fused sodium acetate in the preparation of N-aryl maleimides is illustrated by the following experiment. A mixture of 57.4 parts of N-phenylmaleamic acid and 102.1 parts of 95% acetic anhydride was heated with stirring on the steam bath at 90° C. for 30 minutes before a dark yellow solution was effected. The reaction mixture, after stirring at room temperature for an additional 10–15 minutes, was then poured into a vigorously stirred slurry of ice and water. The insoluble product was found to be 15 parts of the original N-phenylmaleamic acid, M. P. 203–204° C.

EXAMPLE II

A suspension of 61.6 parts of N-p-tolylmaleamic acid (M. P. 174–170° C.), 10 parts of fused sodium acetate, and 108.2 parts of 95% acetic anhydride was heated with stirring to 90° C. at which temperature the maleamic acid went into solution and the heating was discontinued. The heat of reaction, however, was sufficient to cause the temperature to rise to 93° C. during the subsequent period of 10–15 minutes. The reaction mixture was then allowed to stand at room temperature (25° C.) for about one hour after which it was poured in a thin stream into 1200 parts of ice water. The resulting precipitate of yellow needles was filtered, washed until neutral with 5% aqueous sodium bicarbonate solution and water, and then air dried. Fifty-one (51) parts of the crude product melting at 137–143° C. thus obtained gave on recrystallization from a mixture of naphtha (6 parts by volume)-benzene (1 part by volume), 38 parts (68% of the theoretical yield) of yellow needles of N-p-tolylmaleimide melting at 149–150° C.

Analysis—Calculated for $C_{11}H_9NO_2$: N, 7.47. Found: N, 7.55.

The following table lists a number of maleimides prepared from the corresponding maleamic acids by the process of this invention as illustrated by the methods of Examples I and II.

Table I

| Maleimides | Properties | Analysis: Percent Nitrogen | |
|---|---|---|---|
| | | Found | Calculated |
| N-o-tolyl- | Yellow needles, M. P. 70–71° C. | 7.54 | 7.47 |
| N-m-tolyl- | Yellow needles, B. P. 142–145° C./2 mm. | 7.69 | 7.47 |
| N-o-nitrophenyl- | White leaflets, M. P. 130–131° C. | 12.96 | 12.83 |
| N-m-nitrophenyl- | White leaflets, M. P. 126–127° C. | 12.77 | 12.83 |
| N-p-nitrophenyl- | White leaflets, M. P. 167–168° C. | 13.09 | 12.83 |
| N-o-biphenyl- | Pale yellow crystals, M. P. 139–140° C. | 5.57 | 5.62 |
| N-p-biphenyl- | Brownish yellow needles, M. P. 189–190° C. | 5.76 | 5.62 |
| N-p-ethoxyphenyl- | Yellow crystals, M. P. 75–76° C. | 6.75 | 6.44 |
| N-alpha-naphthyl- | Yellow crystals, M. P. 116–117° C. | 6.19 | 6.27 |
| N,N'-(1,3-phenylene)-bis- | Yellow needles, M. P. 198–199° C. | 10.17 | 10.43 |
| N-p-dodecylphenyl- | White leaflets: M. P. 167–168° C. | 4.27 | 4.11 |
| N-2-ethylhexyl- | B. P. 126–131° C./8 mm. | 6.47 | 6.69 |

The maleamic acid intermediates for the above maleimide syntheses were obtained by the reaction in chloroform solution of approximately equimolecular proportions of maleic anhydride and the primary amine. In general, good results were obtained by adding the amine, dropwise, to a stirred chloroform solution of maleic anhydride while maintaining the temperature of 15–20° C. during the mixture of these reactants. The reaction was continued at this temperature for about ½ hour, whereupon the precipitated maleamic acid was filtered off, washed, and air-dried.

Although the invention has been illustrated with the foregoing specific examples, it is, in general, applicable to any maleamic acid preparable by reaction of maleic anhydride and primary amines, e. g. methyl-, ethyl-, isopropyl-, n-butyl-, isobutyl-, isoamyl-, n-hexyl-, n-heptyl-, n-octyl-, n-dodecyl-, cyclohexyl-, and benzylamines; 2-chloroaniline, 4-chloroaniline, 2,4-dichloroaniline, 2,4,6-trichloroaniline, 4-bromoaniline, 4-methoxyaniline, 4-sulfamylaniline, 6-nitro-1-naphthylamine, 2-naphthylamine, 6-methoxy-8-aminoquinoline, benzidine and hexamethylenediamine.

The maleamic acids employed in the process of the present invention may be described as the maleamic acids of primary amines and therefore have on the maleamic nitrogen a hydrogen and an organic radical bonded to said nitrogen from carbon of said radical which radical is the non amino portion of a primary amine.

Particularly preferred for the process of this invention are the N-arylmaleamic acids, e. g. N-phenyl, N-naphthyl, N-biphenyl, and N-p-tolyl; N-alkoxyaryl, e. g., N-p-ethoxyphenyl; and N-nitroaryl, e. g., N-nitrophenylmaleamic acids, since these ordinarily give high yields of the corresponding N-arylmaleimides which make them especially desirable from the standpoint of economy. A further desirable class is that of maleamic acids having one to two HOOCCH=CHCONH— radicals attached to aromatic carbons of an aromatic hydrocarbon radical of from one to two valences. This class includes the N-phenyl-, N-o-,m-, and p-tolyl, N-p-dodecylphenyl-, N-o-, and p-biphenyl-, N-alpha-, and N-beta-naphthyl- and N,N'-(1,2-, 1,3-, and 1,4-phenylene) bis-maleamic acids.

While it is preferred to employ acetic anhydride because of its availability at low cost, the process of this invention is in general, applicable to anhydrides of the lower (two to five carbon) saturated fatty acids, e. g., propionic, butyric, isobutyric, and valeric anhydrides may be used. The use of anhydrous sodium acetate is in the interest of economy, but other anhydrous alkali metal salts of the two to five carbon saturated fatty acids, e. g., sodium butyrate, potassium propionate, lithium acetate, and sodium valerate may be employed. Alkali metal acetates are preferred.

The process of this invention may be effected with different proportions of the various reactants. Optimum results, however, are usually obtained with an excess of the anhydride over the maleamic acid. For example, mole ratios of 1:1 to 1:20 or more of the maleamic acid to the acetic anhydride are within the operable ratios of this invention, although it is preferred to use mole ratios of 1:3 to 1:5 since these amounts, in most cases, give the optimum results. The amount of anhydrous salt of the saturated aliphatic monocarboxylic acid may vary from 1 to 20% of the weight of the acetic anhydride present and preferably between 5 and 10% for the most economical and satisfactory results.

Although the invention is satisfactorily operable at temperatures of at least 60° C. and below the decomposition point of the reactants and the resulting maleimides, it is preferred to operate at temperatures within the range of 80° C. to 100° C., since these temperatures usually give the best results.

The products of this invention are especially useful as insecticides and fungicides and, in many cases, are also useful for the preparation of polymeric products.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process which comprises treating N-phenylmaleamic acid with a stoichiometric excess of acetic anhydride and from 1 to 20%, by weight of the acetic anhydride, of sodium acetate at a temperature of at least 60° C. but below the decomposition temperature of the reactants and of the maleimide formed and isolating N-phenylmaleimide by mixing the reaction mixture with water and separating the N-phenylmaleimide from the aqueous menstruum.

2. Process for preparing an N-arylmaleimide which comprises treating an N-arylmaleamic acid wherein the aryl group is mononuclear with a stoichiometric excess of acetic anhydride and from 1 to 20%, by weight of the acetic anhydride, of sodium acetate at a temperature of at least 60° C. but below the decomposition temperature of the reactants and of the maleimide formed.

3. Process for preparing an N-arylmaleimide which comprises treating an N-arylmaleamic acid with a stoichiometric excess of acetic anhydride and from 1 to 20%, by weight of the acetic anhydride of sodium acetate at a temperature of at least 60° C. but below the decomposition temperature of the reactants and of the maleimide formed.

4. Process for the preparation of a maleimide which comprises treating a maleamic acid having on the nitrogen one hydrogen and one monovalent aromatic radical of the class consisting of aryl, alkoxyaryl, and nitroaryl radicals with a stoichiometric excess of acetic anhydride and from 1 to 20%, by weight of the acetic anhydride of sodium acetate at a temperature of at least 60° C. but below the decomposition temperature of the reactants and of the maleimide formed.

5. Process for preparing an N-arylmaleimide which comprises treating an N-arylmaleamic acid wherein the aryl group is mononuclear with from 3 to 5 moles, per mole of the maleamic acid, of acetic anhydride and from 5 to 10%, based on the acetic anhydride, of sodium acetate at 80° C. to 100° C. and isolating the maleimide formed.

6. Process for the preparation of N-phenylmaleimide which comprises treating N-phenylmaleamic acid with from 3 to 5 moles, per mole of the maleamic acid, of acetic anhydride and from 5 to 10%, based on the acetic anhydride, of sodium acetate at 80° C. to 100° C. and isolating the maleimide formed.

7. Process for the preparation of a maleimide which comprises treating a maleamic acid having, on the amido nitrogen, one hydrogen and one monovalent aromatic radical of the class consisting of aryl, alkoxyaryl, and nitroaryl radicals with a stoichiometric excess of an acid anhydride $(RCO)_2O$ wherein R is alkyl of one to four carbons and from 1 to 20%, by weight of the anhydride, of an alkali metal salt of a fatty acid $RCOOH$ wherein R is as before at a temperature of at least 60° C. but below the decomposition temperature of the reactants and of the maleimide formed.

8. In the preparation of an N-arylmaleimide, the step which comprises treating an N-arylmaleamic acid with a stoichiometric excess of acetic anhydride and from 1 to 20%, by weight of the acetic anhydride, of sodium acetate at a temperature of at least 60° C. but below the decomposition temperature of the reactants and of the maleimide formed.

NORMAN EDWARD SEARLE.

REFERENCES CITED

The following references are of record in the file of this patent:

UNITED STATES PATENTS

| Number | Name | Date |
|---|---|---|
| 2,205,558 | Flett | June 25, 1940 |
| 2,262,262 | Speer | Nov. 11, 1941 |

OTHER REFERENCES

Chem. Abstracts—vol. 5—page 1403—(1911).

Certificate of Correction

Patent No. 2,444,536.  
July 6, 1948.

NORMAN EDWARD SEARLE

It is hereby certified that error appears in the printed specification of the above numbered patent requiring correction as follows: Column 2, line 51, Example II, for "174–170° C." read *174–175° C.*; and that the said Letters Patent should be read with this correction therein that the same may conform to the record of the case in the Patent Office.

Signed and sealed this 21st day of September, A. D. 1948.

[SEAL]

THOMAS F. MURPHY,  
*Assistant Commissioner of Patents.*